United States Patent
Lehmann

[11] Patent Number: 6,164,248
[45] Date of Patent: Dec. 26, 2000

[54] CONTROL DEVICE FOR THE COOLANT AND HEATING CIRCULATION CIRCUIT OF AN INTERNAL COMBUSTION ENGINE

[75] Inventor: Kai Lehmann, Ludwigsfelde, Germany

[73] Assignee: DaimlerChrysler AG, Stuttgart, Germany

[21] Appl. No.: 09/262,722

[22] Filed: Mar. 4, 1999

[30] Foreign Application Priority Data

Mar. 4, 1998 [DE] Germany ............... 198 09 124

[51] Int. Cl.⁷ ....................................... F01P 7/14
[52] U.S. Cl. ......................................... 123/41.1
[58] Field of Search ................. 123/41.08, 41.09, 123/41.1; 236/34.5

[56] References Cited

U.S. PATENT DOCUMENTS

| | | | |
|---|---|---|---|
| 2,401,646 | 6/1946 | Johnson | 123/41.09 |
| 4,644,909 | 2/1987 | Nishikata et al. | |
| 4,759,316 | 7/1988 | Itakura | 123/41.08 |
| 5,095,855 | 3/1992 | Fukuda et al. | 123/41.44 |

FOREIGN PATENT DOCUMENTS

| | | |
|---|---|---|
| 1 476 417 | 10/1971 | Germany. |
| 41 25 366 | 3/1993 | Germany. |
| 43 24 749 | 1/1995 | Germany. |
| 44 16 039 | 8/1995 | Germany. |
| 56-29224 | 3/1981 | Japan. |
| 60-237116 | 11/1985 | Japan. |
| 60-249666 | 12/1985 | Japan. |
| 7-23872 | 5/1995 | Japan. |
| 9-264440 | 10/1997 | Japan. |
| 1 156 169 | 6/1969 | United Kingdom. |

*Primary Examiner*—Andrew M. Dolinar
*Assistant Examiner*—Katrina B. Harris
*Attorney, Agent, or Firm*—Kenyon & Kenyon

[57] ABSTRACT

A control device for the coolant and heating circulation circuit of an internal combustion engine having a radiator, a feed pump, and a heat exchanger. The control device includes a rotary slide valve arranged in a valve housing. The rotary slide valve has at least nearly a sleeve shape and is provided with an axial collector opening for the feed or removal of coolant to or from the intake or delivery side of the feed pump. Provision is made in the circumferential wall of the valve housing for inlet or outlet openings for a bypass-circulation line of the coolant, for a radiator line connected to the radiator, and for a heating line leading to the heat exchanger of the heating circulation circuit. The rotary slide valve has, in its circumferential wall, a control opening having an opening through which a connection is established from the collector opening to one individual inlet or outlet opening or, for a mixed operation, through which an overlapping connection is established to two adjacent inlet or outlet openings.

8 Claims, 3 Drawing Sheets

CONTROL DEVICE FOR THE COOLANT AND HEATING CIRCULATION CIRCUIT OF AN INTERNAL COMBUSTION ENGINE

FIELD OF THE INVENTION

The present invention relates to a control device for the coolant and heating circulation circuit of an internal combustion engine.

RELATED TECHNOLOGY

To control the coolant and heating circulation circuit of an internal combustion engine, thermostats have been used which switch a bypass circulation circuit as a function of the temperature in the warm-up phase of the internal combustion engine. In the same way, frequency valves have been used which switch the coolant flow in the heating circulation circuit. Slide valves and turning valves with stepping-motor drive have also been used for controlling the coolant and heating circulation circuit.

German Patent Application No. 43 24 749 A1 describes a regulating valve for a coolant circulation circuit, having one radial inlet and three radial outlets, the coolant being distributed by a rotary slide valve.

A disadvantage of this regulating valve is that there are always resulting forces on the rotary slide valve which can lead to locking, and/or correspondingly, make strong driving motors necessary for its adjustment. In addition, the adjustment settings or mixed settings are limited.

German Patent No. 41 25 366 C1 describes a 3/2-way valve for liquid circulation circuits in vehicles, having one axial inlet and two radial outlets. The adjustment possibilities for this valve are also limited, so that still further devices are necessary for the open-loop or closed-loop control of a coolant and heating circulation circuit.

SUMMARY OF THE INVENTION

An object of the present invention is to create a control device, in which a plurality of functions of adjusting and switching elements are integrated in such a way that, if necessary, further controlling elements may be omitted in a coolant and heating circulation circuit of a motor vehicle.

The present invention provides a control device for the coolant and heating circulation circuit of an internal combustion engine, having a radiator, having a feed pump and having a further partial circulation circuit, in particular having a heat exchanger for the heating circulation circuit, with the following features: a rotary slide valve (3) is arranged in a valve housing (2); the rotary slide valve (3) has at least nearly a sleeve shape; the rotary slide valve (3) is provided with an axial collector opening (4) for the feeding or removal of coolant to the intake or delivery side of the feed pump (8); provision is made in the circumferential wall of the valve housing (2) for inlet and outlet openings (10,11,12) for a radiator line (16) connected to the radiator (20) and for at least two further partial circulation circuits (14, 18); the rotary slide valve (3) has, in its circumferential wall, a control opening (9) having an opening width, through which a connection is created from the collector opening (4) to one individual inlet or outlet opening (10,11,12) or, for a mixed operation, an overlapping connection is created to two adjacent inlet or outlet openings (10,11,12).

Using the control device of the present invention, the entire circulation circuit for the cooling and for the heating can be controlled by a single device for nearly all cases occurring in practical use. Both the control of individual openings, as well as mixed operations are possible, so that further open-loop and closed-loop controlling elements may be dispensed with in the coolant and heating circulation circuit.

Another advantage of the approach according to the present invention is that, because of the axial feed or discharge, and the inlet or outlet openings at the periphery of the valve housing, no resulting forces act on the rotary slide valve, it being possible to make do with small actuating and retaining forces for the rotary slide valve.

Besides the individual flows, virtually all mixed stages occurring in practical use may be realized by the arrangement of the present invention. Moreover, only small pressure losses occur when working with the adjusting device of the present invention, accompanied at the same time by high adjusting speeds.

If the inlet and outlet openings are placed in an identical radial plane, then a very compact type of construction is achieved as well.

The control device of the present invention may be operated in two directions, namely, with one axial inlet and corresponding outlets or discharge openings at the periphery, the collector opening being connected to the delivery side of a feed pump, or else in reverse, the collector opening being connected to the intake side of a feed pump, and the inflows from the radiator and from further partial circulation circuits being effected accordingly by way of the circumferential wall of the rotary slide valve.

BRIEF DESCRIPTION OF THE DRAWINGS

Advantageous further developments and refinements of the present invention are described with reference to the drawings, in which.

DETAILED DESCRIPTION

Figure 1:
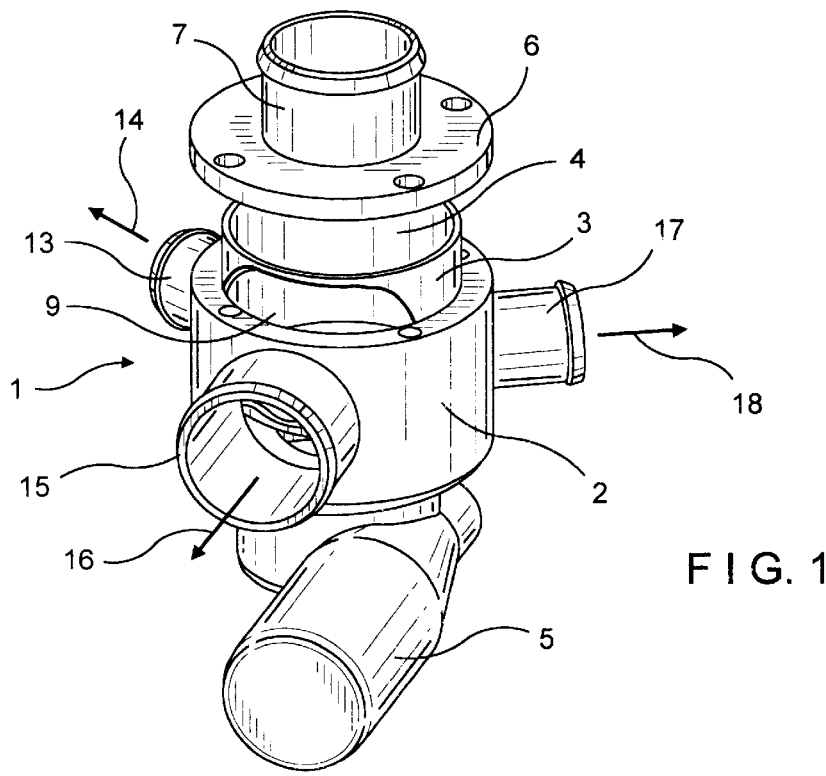
FIG. 1 shows a perspective representation of a control device according to the present invention.

According to FIG. 1, control device 1 has a cylindrical valve housing 2, in which a sleeve-shaped rotary slide valve 3 is supported. Rotary slide valve 3 is provided with an axial collector opening 4 on one end face, while it is closed on the other side, and is provided with a driving device 5 to swivel it about its longitudinal axis. Valve housing 2, on the side facing away from driving device 5, is provided with a cover 6 having a central flange 7, via which a connection is effected to a pump 8, shown in FIGS. 7 and 8, for collector opening 4.

Rotary slide valve 3 is provided in its circumferential wall with a control opening 9. Depending on the direction of flow, coolant is distributed from collector opening 4, via control opening 9 into inlet or outlet openings in valve housing 2, or conducted from the inlet or outlet openings to collector opening 4. In the exemplary embodiment shown in FIG. 1, the coolant is fed axially via collector opening 4 and from there, is passed on through control opening 9 via an outlet opening 10, 11 or 12. Outlet opening 10 is provided with a connector 13, via which a connection is effected to a bypass-circulation line 14. Outlet opening 12 is connected via a connector 15 to a cooling line 16, while outlet opening 11 is connected via a connector 17 to a heating line 18.

Figure 2:
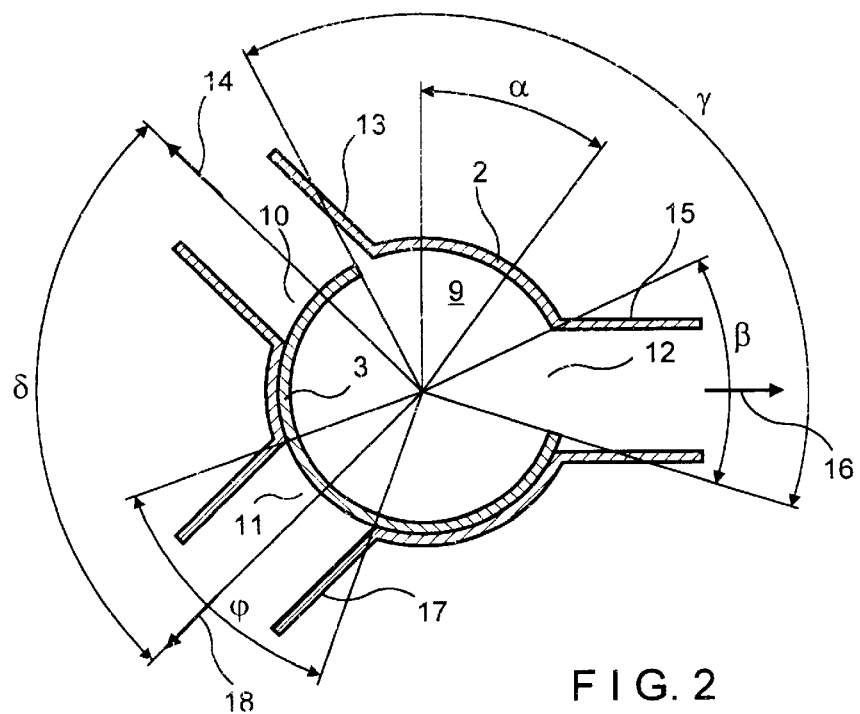
FIG. 2 shows a schematic cross-section through a control device according to the present invention.

As is apparent from FIG. 2 and from the various operating positions in FIGS. 3–6, control opening 9 in the circumferential wall of rotary slide valve 3 has an opening width permitting not only individual flows from collector opening 4 to one of outlet openings 10, 11 or 12, but also overlapping connections for mixed operations.

According to FIG. 2, to this end, the following conditions must be met:

$$\delta < \gamma - \left(\frac{\varphi n}{2} + \frac{\varphi m}{2}\right)$$

Where:
- $\gamma$ signifies the opening angle of the rotary slide valve
- $\delta$ signifies the angle between the connectors
- $\varphi$ signifies the angle opening of the connectors
- $\beta$ signifies the released opening angle of the corresponding connector
- $\delta_1 + \delta_2 + \delta_3 = 360°$, the intention being to select the individual angles to be as equal as possible
- $B_{max} = \varphi$ full opening of the cross-section FIG. 2 shows the angles with the assistance of a sectional view through the center plane of the connector cross-sections. All the angles are directly connected with the cross-sectional functions. Besides the relatively simple form of a bore hole for the openings, other non-circular cross-sections may also be selected. In this manner, a further degree of freedom may be achieved in determining the adjusting performance.

In the exemplary embodiment shown, connectors 13, 15 and 17 branch off radially from valve housing 2. To achieve a form which is more favorable for the flow, it is also possible to fix the connectors onto valve housing 2 semi-axially, i.e., inclined toward the radial plane. In the same way, instead of a cylindrical shape, the valve housing itself may have a conical shape, it then also being necessary to adapt the shape of rotary slide valve 3 accordingly to the conical shape.

Figure 3:
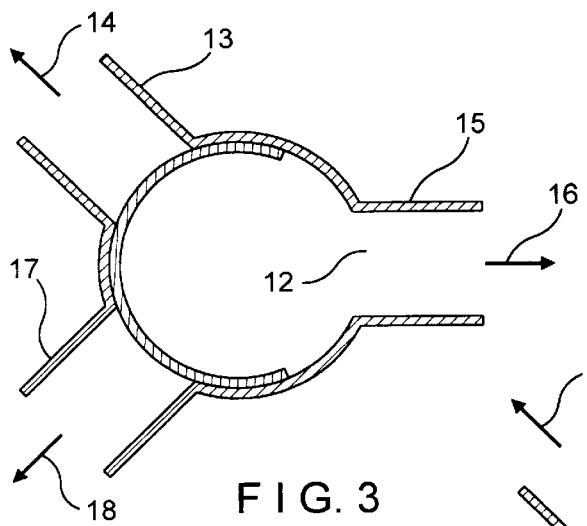
FIGS. 3–6 show various control positions of a control device according to the present invention.
Figure 4:
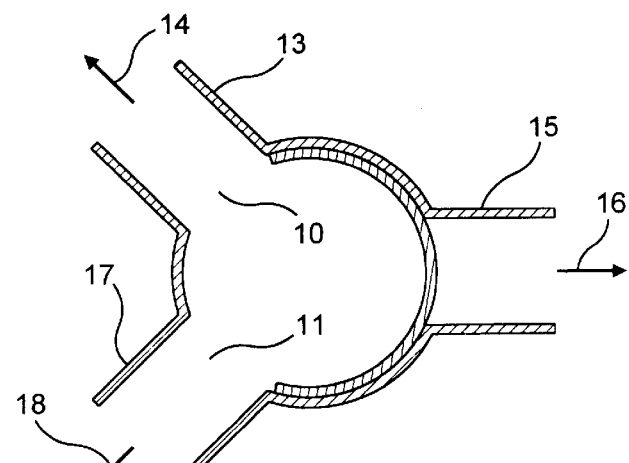
Figure 5:
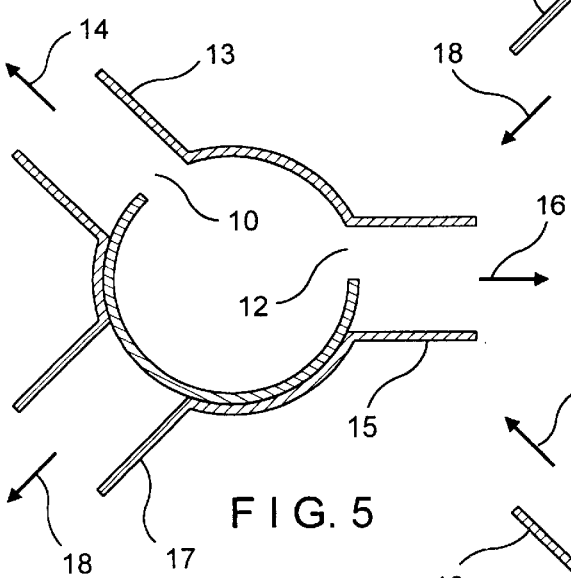

FIGS. 3–6 show various control positions of control device 1. Thus, FIG. 3 shows the position during the normal "cooling" operation. FIG. 4 shows a first mixed operation in the warm-up phase of the engine, with simultaneous heating operation. FIG. 5 shows a second mixed operation during the "warm-up" and "cooling" phase.

Figure 6:
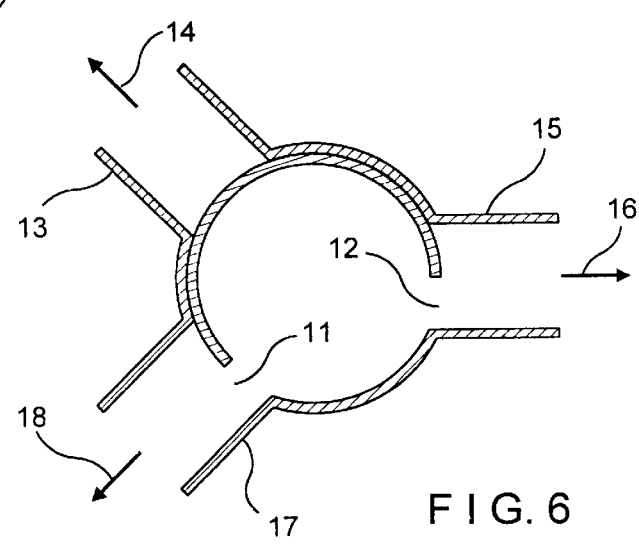

FIG. 6 shows a third mixed operation during the "heating and cooling" phase.

According to the operation shown in FIG. 3, still other individual connections from control opening 9 to an individual outlet opening are also possible, if necessary.

Instead of the heating circulation circuit, provision may also be made for a second bypass circulation, e.g., of the cylinder head.

In the same way, instead of the heating circulation circuit and/or bypass-circulation line 14, one or two other partial circulation circuits may be provided. Thus, for example, it is possible to provide a partial circulation circuit for an additional heating and/or a further partial circulation circuit for an exhaust-gas heat-exchanger device.

As is evident, rotary slide valve 3 may switch each circulation circuit separately. In addition, any mixed stages may be adjusted between two respective circulation circuits.

No resulting flow forces are present at control device 1 which would be capable of producing a torque about the axis of rotation of rotary slide valve 3. As a result, changes in the position of the rotary slide valve because of a flow traversal do not occur, which is why the required power for driving device 5 may be held correspondingly low. Due to the small displacement forces, there is also normally no need for special support of rotary slide valve 3. Moreover, since in each angle position, cross-sections are opened in the radial direction, only very slight pressure drops occur across the control device as well. As a result, special sealing of the individual inlets and outlets may be omitted.

In the exemplary embodiment shown, all outlet openings 10, 11 and 12 lie in the same radial plane, permitting a very short overall length.

Figure 7:
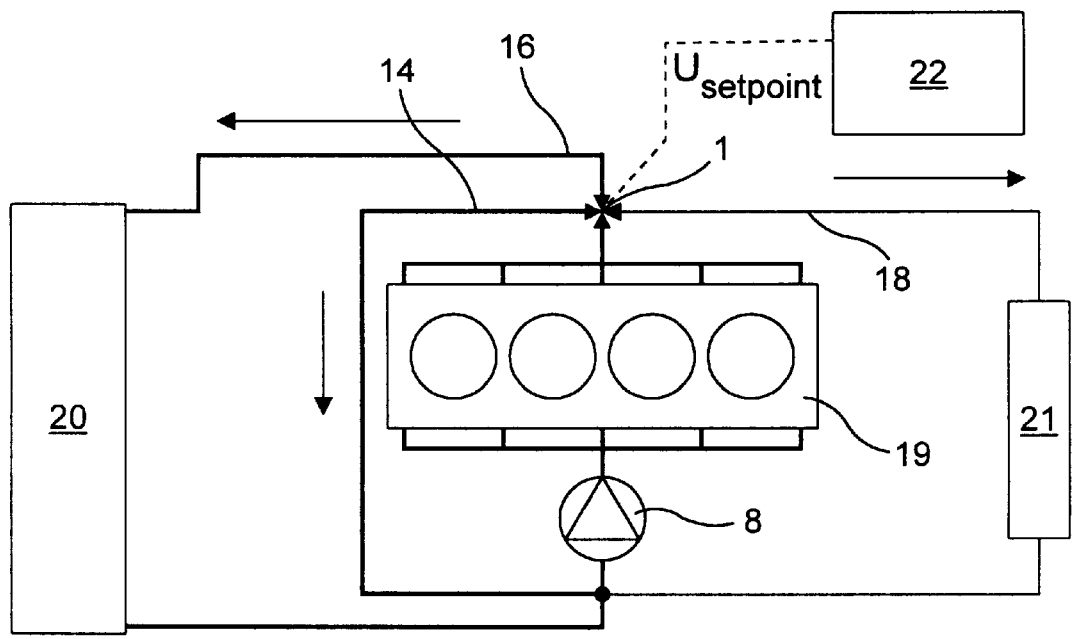
FIG. 7 shows an arrangement of a control device according to the present invention in a coolant and heating circulation circuit.

An arrangement of control device 1 shown in FIGS. 1–6, with one axial feed from pump 8 and the three radial outlet openings 10, 11 and 12 in the coolant and heating circulation circuit of an internal combustion engine 19 is shown in FIG. 7. In this case, flange 7 is connected to the delivery side of pump 8. The arrows next to bypass-circulation line 14, next to radiator line 16 which leads to a radiator 20 and from there back again to pump 8, and next to heating-circulation line 18, in which a heat exchanger 21 is arranged, from which there is a return line to pump 8, show the respective direction of the coolant flow. Driving device 5 for rotary slide valve 3 is controlled with $U_{setpoint}$, using a control electronics 22, not shown more precisely.

In the arrangement of the control device shown in FIG. 7, rotary slide valve 3 distributes the individual partial volumetric flows in accordance with its position.

Figure 8:
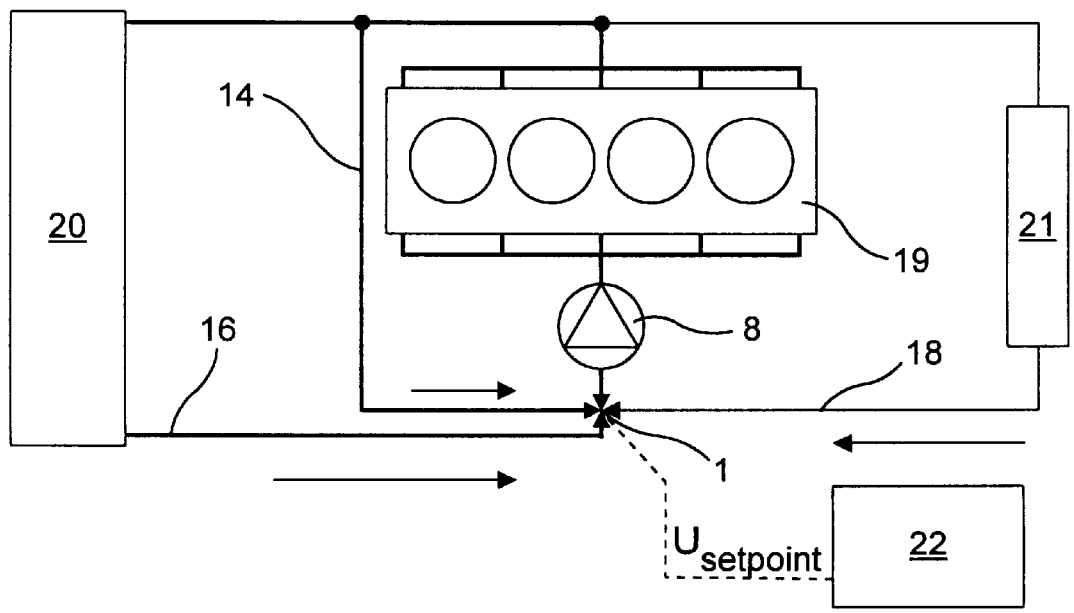
FIG. 8 shows another arrangement of a control device according to the present invention in a coolant and heating circulation circuit.

According to the state of the control device shown in FIG. 8, rotary slide valve 3 joins the individual partial volumetric flows in accordance with its position. As is apparent, in this case, flange 7 is connected to pump 8 on the intake or incoming side. The arrows next to bypass-circulation line 14, radiator line 16 and heating line 18 again indicate the direction of flow of the coolant. In this case, the openings in the valve housing represent inlet openings 10, 11 and 12, rather than outlet openings. Thus, collector opening 9 is used to supply the coolant to the intake side of feed pump 8. In this state of control device 1 as well, the mode of operation of the control device corresponds to the mode of operation depicted in FIG. 7

What is claimed is:

1. A control device for a coolant and heating circulation circuit of an internal combustion engine, the coolant and heating circulation circuit having a radiator, a feed pump, and at least two partial circulation circuits, the control device comprising:

a valve housing including a first circumferential wall having inlet and outlet openings for a radiator line connected to a radiator and for at least two of the at least two partial circulation circuits; and an at least partially sleeve-shaped rotary slide valve disposed in the valve housing, the rotary slide valve including an axial collector opening for inlet or discharge of a coolant to or from an intake or delivery side of the feed pump, and including a second circumferential wall having a control opening capable of connecting the collector opening to two adjacent ones of the inlet or outlet openings for a mixed operation or to an individual one of the inlet or outlet openings.

2. The control device as recited in claim 1 wherein the coolant and heating circulation circuit includes a heat exchanger.

3. The control device as recited in claim 1 wherein the coolant and heating circulation circuit includes a heat exchanger and wherein a first and a second one of the at least two partial circulation circuits are provided for a heating line connected to the heat exchanger and for a coolant bypass-circulation line, respectively.

4. The control device as recited in claim 1 wherein at least one of a first and a second one of the at least two partial circulation circuits are provided for at least one of a heating device and an exhaust-gas heat-exchanger device.

5. The control device as recited in claim 1 wherein the inlet or outlet openings are disposed in a same radial plane.

6. The control device as recited in claim 5 wherein the inlet or outlet openings are uniformly distributed over a periphery of the valve housing.

7. The control device as recited in claim 1 further comprising a connector attached to each of the inlet or outlet openings, each connector extending semi-axially from the respective inlet or outlet opening.

8. The control device as recited in claim 1 wherein the rotary slide valve is connected to a driving device at a side of the rotary slide valve facing away from the axial collector opening.

* * * * *